United States Patent [19]

Underwood

[11] Patent Number: 5,380,247
[45] Date of Patent: Jan. 10, 1995

[54] GRAIN TRANSPORTATION APPARATUS FOR A COMBINE

[75] Inventor: Mark R. Underwood, Burr Oak, Kans.

[73] Assignee: Agri-Technology, Burr Oak, Kans.

[21] Appl. No.: 80,291

[22] Filed: Jun. 21, 1993

[51] Int. Cl.⁶ ............................................. A01F 12/52
[52] U.S. Cl. ........................................ 460/114; 460/12; 460/119; 460/903
[58] Field of Search ................... 460/114, 12, 13, 119, 460/903, 11

[56] References Cited

U.S. PATENT DOCUMENTS

| | | |
|---|---|---|
| 629,758 | 8/1899 | Abell . |
| 1,082,191 | 12/1913 | George . |
| 2,420,543 | 5/1947 | Johnson . |
| 2,424,181 | 7/1947 | Messenger . |
| 3,245,413 | 4/1966 | Essex . |
| 3,404,686 | 10/1968 | Johnson . |
| 3,580,257 | 5/1971 | Teague ............................ 460/114 X |
| 4,060,960 | 12/1977 | Hengen et al. ................. 460/114 X |
| 4,100,720 | 7/1978 | Carnewal et al. ............... 460/114 X |
| 4,178,944 | 12/1979 | Hanaway . |
| 4,441,511 | 4/1984 | Schroeder ............................ 460/13 |
| 4,466,447 | 8/1984 | Hoefer et al. ........................ 460/13 |
| 4,489,733 | 12/1984 | Underwood .......................... 56/209 |
| 4,800,902 | 1/1989 | Maust ............................. 460/114 X |
| 4,907,402 | 3/1990 | Pakosh ........................... 460/119 X |
| 5,029,436 | 7/1991 | Fredriksen et al. ............. 460/119 X |
| 5,033,932 | 7/1991 | Compton ............................ 460/114 |

Primary Examiner—Terry Lee Melius
Attorney, Agent, or Firm—James E. Bradley

[57] ABSTRACT

A combine has a conveyor for returning clean grain and grain returns to a grain bin and threshing rotor, respectively, using a single conveyor housing which is divided by a partition into separate clean grain and grain returns compartments. A plurality of paddles are mounted within the compartments and are driven by a flexible linkage which extends around the frame of the combine within the conveyor housing. The grain bin is pivotally mounted along a pivot axis which allows the grain bin to be pivoted toward an opening of the grain bin to facilitate the flow of grain from the grain bin to an unloader for discharging the grain from the combine.

14 Claims, 4 Drawing Sheets

5,380,247

GRAIN TRANSPORTATION APPARATUS FOR A COMBINE

BACKGROUND OF THE INVENTION

1. Field of the Invention

This invention relates to agricultural equipment and in particular to a combine for harvesting and threshing grain having a conveyor for transporting both clean grain and grain returns to a grain bin and threshing rotor, respectively. The grain bin is pivotally mounted adjacent to an unloader to facilitate the flow of clean grain from the grain bin so that it may be discharged from the combine.

2. Description of the Prior Art

Combines and agricultural equipment employing a grain bin for temporary storage of grain have used grain bins which are immovably mounted to the combine. In order to remove grain from the grain bin, the floor of the grain bin is sloped toward an opening which is in communication with a grain auger for discharging the grain from the combine or agricultural equipment. The sloped floor of the grain bin causes grain to flow through the opening but reduces the volume of the grain bin thereby reducing the amount of grain that can be stored.

When the grain bin is full, the grain is discharged by means of an auger which receives the grain as the grain flows through the opening. Because grain augers require very high forces and energy to elevate grain, the use of an auger is very inefficient. Augers tend to crack and damage the grain and are very hard to clean.

In most combines, clean grain is separated from tailings and chaff by the use of sieves. A blower blows air across the sieves to discharge the lighter chaff as clean grain falls through the sieves and is conveyed up to the grain bin. Tailings, which are too heavy to be blown away from the combine but too large to fall through the sieves, will sometimes contain grain. To prevent the loss of this grain, the tailings or grain returns must be collected and rethreshed.

U.S. Pat. No 4,489,733 describes an axial flow combine with elevating rings which extend circumferentially around the body of the combine. The elevating rings have separate compartments for both grain returns and clean grain. The elevating rings rotate causing grain returns and clean grain to be delivered to a threshing rotor and a grain bin, respectively. Because of the circular shape of the elevating rings, however, the elevating rings require a great deal of space.

For the above reasons, there exists a need for a grain bin having a large capacity which allows grain to flow easily from the grain bin for discharge, and for a combine that has a means for returning grain to the grain bin and tailings to a threshing rotor for rethreshing in a simple but effective way without requiring a large amount of space.

SUMMARY OF THE INVENTION

The present invention is directed toward a grain bin as is provided on a combine having a frame mounted on wheels. The grain bin is pivotally mounted to the frame of a combine on a pivot axis which is parallel to a longitudinal axis of the frame. The grain bin is rectangular with a flat bottom which is in a horizontal plane relative to the frame when the grain bin is in a resting position.

The grain is discharged by a discharge conveyor or unloader mounted adjacent to the grain bin. The unloader has an intake which is in communication with an opening in the lower portion of the grain bin. The unloader consists of an unloader housing with several paddles spaced apart from each other at intervals and mounted to a flexible linkage within the unloader housing. The flexible linkage is mounted to and driven by a series of sprockets.

In order to discharge the grain, the grain bin is pivoted so that the bottom of the grain bin is at an inclined position relative to the frame causing grain to flow through the opening and into the intake of the unloader. The paddles force the grain through the unloader housing and away from the combine.

A conveyor housing is also mounted to the frame of the combine and has an interior extending completely around the combine along both sides, above the threshing rotor and grain bin and below a sieve section. The interior of the conveyor housing is divided into a returns compartment and grain compartment by a partition which extends along the length of the housing. Each of the compartments has a receiving end and a discharge end. The receiving end of the returns compartment is located below the sieve section for receiving grain returns, such as tailings, and the discharge end of the returns compartment is located above the threshing rotor. The receiving end of the grain compartment is also located below the sieve section with the discharge end of the grain compartment being located above the grain bin.

In the conveyor housing are mounted a plurality of paddles which are spaced apart from each other at intervals along a flexible linkage which is rotatably driven around a series of pulleys. The flexible linkage is continuous so that it can be continually passed through the interior of the conveyor housing.

DETAILED DESCRIPTION OF THE INVENTION

Figure 1:
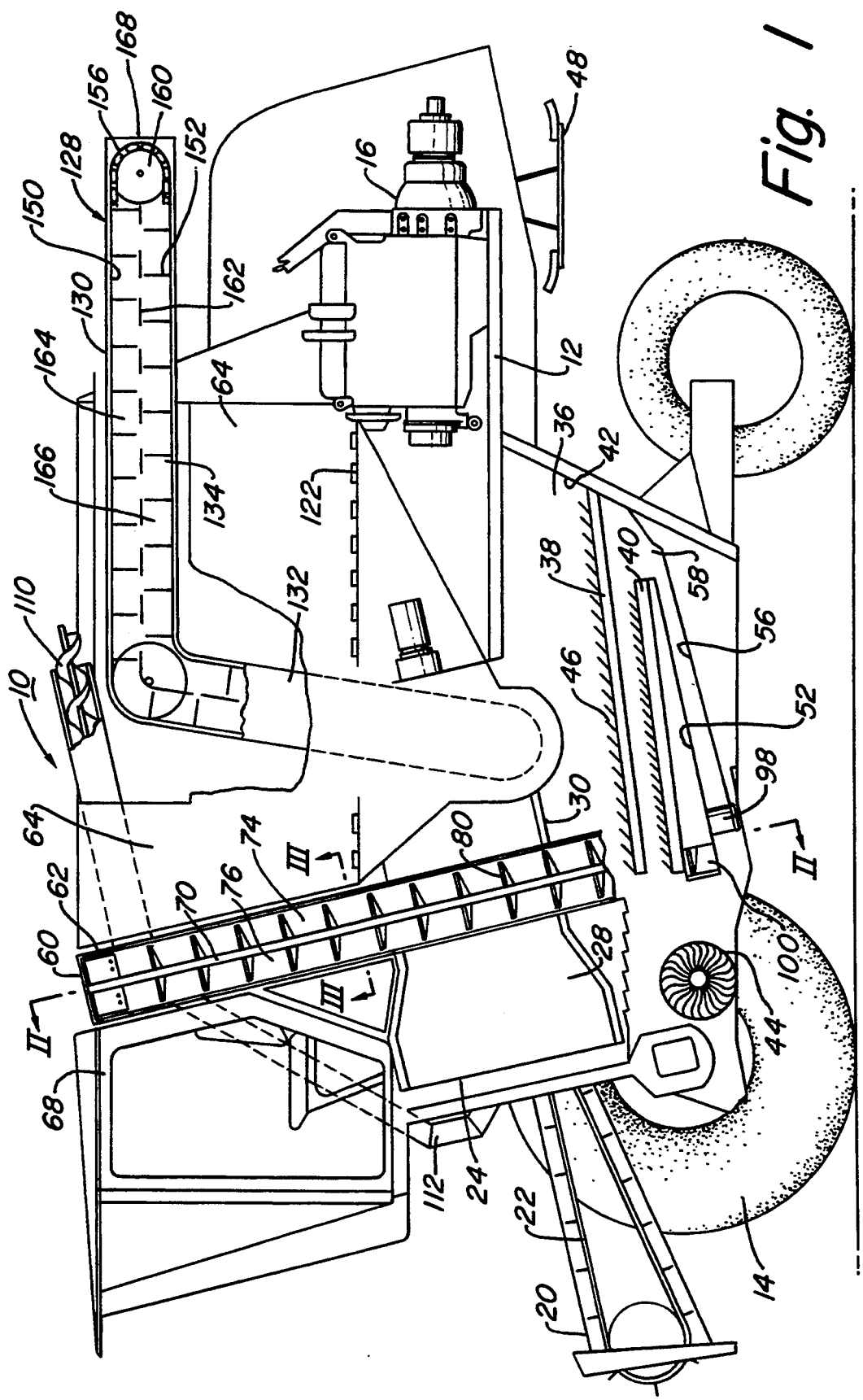
FIG. 1 is a sectional view of a combine, which is partially simplified, and constructed in accordance with the invention.

Referring to FIG. 1, a combine 10 having a frame 12 which is mounted to wheels 14 has an engine 16 for powering equipment and driving the combine 10. A cab 18 located in the forward portion of the combine 10 allows an operator to control the combine 10.

A header assembly 20 located in the lower forward portion of the combine has a blade (not shown) that is reciprocated past knives (not shown) for cutting crop. An auger (not shown) delivers the crop to the center of the head assembly 20. The cut crop is then conveyed upwards on a chain belt 22 into the thresher 24. The thresher 24 consists of a threshing rotor 28 located within a hollow rotor housing 30. The threshing rotor 28 rotates within the rotor housing 30. Rasp bars (not shown) located on the threshing rotor 28 rotate within the rotor housing 30 forcing grain through apertures located in the rotor housing 30.

A sieve section 36 is located below the threshing rotor 28 and rotor housing 30. Sieve section 36 consists of an upper sieve 38 and a lower sieve 40. The sieves 38, 40 are flat plates having a number of small apertures through which grain can fall. Sieves 38, 40 are mounted within a sieve housing 42 and may be shaken or reciprocated by shaker means (not shown). A fan or blower 44 blows air upward and rearward through the sieves 38, 40 and through an opening or window (not shown) in the rearward portion of the sieve housing 42. Rows of inclined fingers 46, which incline to the rear of the sieve housing 42, are located on the sieves 38, 40.

A chaff spreader 48 is located to the rear of the sieve housing 42.

Located below the lower sieve 40 is a grain floor 52 which is sloped downward from the rear of the lower sieve 40 to the front of the lower sieve 40. The grain floor 52 extends across the sieve housing 42 on either side of the combine 10.

A tailings or grain returns floor 56 extends below the upper and lower sieves 38, 40 and below the grain floor 52. The returns floor 56 slopes downward from the rear of the sieve housing 42. An open portion 58 between the rear of the sieve housing 42 and the rear of the sieves 38, 40 and grain floor 52 allows grain returns to fall from the rear of the sieves 38, 40 to the returns floor 56.

A conveyor 60 has a conveyor housing 62 with a rectangular configuration which extends completely around the combine 10, along both sides of the combine 10, above the threshing rotor 28 and a grain bin 64. The conveyor housing 62 is mounted to the frame 12 of the combine 10 and has an interior 68 which is divided into compartments by a partition 70 extending along the length of the housing 62. The compartments consist of a grain returns compartment 74 and a clean grain compartment 76. The grain compartment 76 is located forward of the returns compartment 74.

Figure 3:
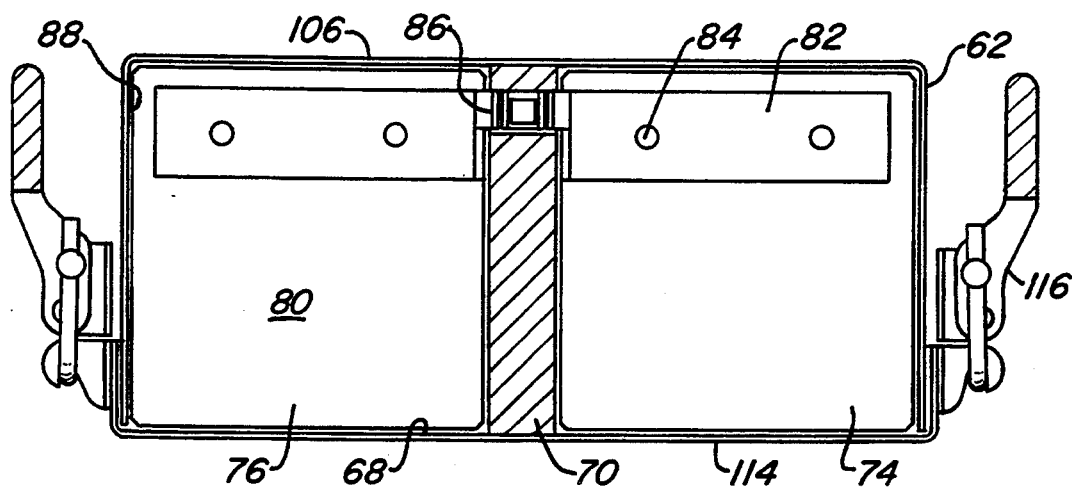
FIG. 3 is a top sectional view of the conveyor housing of FIG. 1 taken along the lines III—III.
Figure 5:
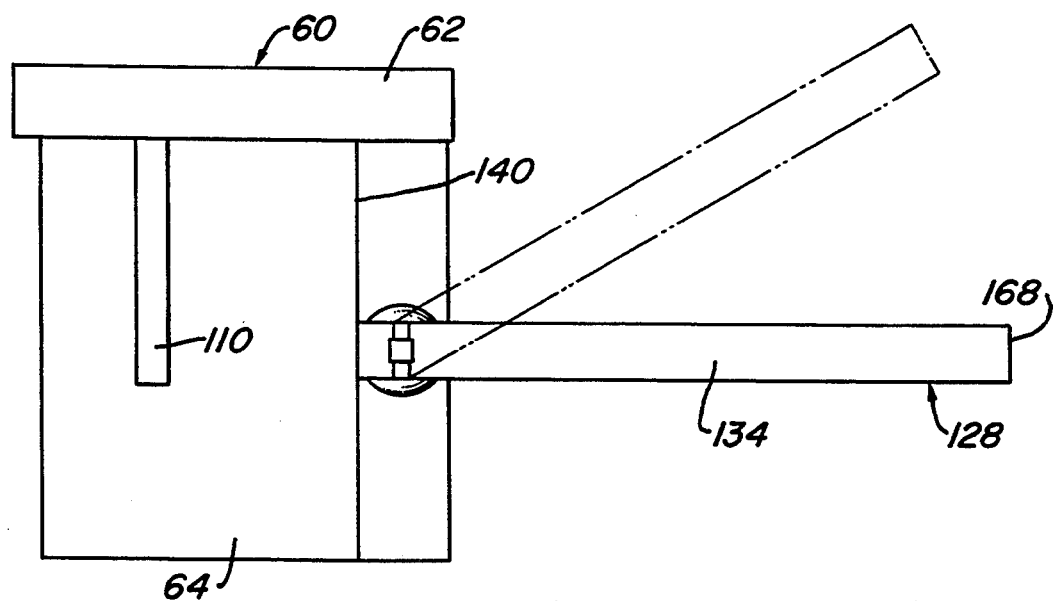
FIG. 5 is a top elevational view of the grain bin and unloader shown extended away from the combine.

A plurality of paddles 80 are spaced apart from each other within each of the compartments 74, 76. Each of the paddles 80 is mounted to a support plate 82 (FIG. 3) by fasteners 84, such as bolts or rivets. The support plates 82 are attached to a flexible linkage 86, such as a chain, so that the paddles 80 are located on either side of the partition 70. The edges of each paddle 80 are in a near touching relationship with interior walls 88 of each compartment 74, 76, as can be seen in FIG. 3. The space between the paddles 80 and the interior walls 88 should be large enough so that the paddles 80 can move freely through the compartments 74, 76 of the conveyor housing 62, yet will not allow clean grain or grain returns to lodge or pass between the walls 88 and the edges of the paddles 80.

The flexible linkage 86 is mounted to and driven around a series of pulleys or sprockets 92 (FIG. 2) which are mounted in four corners 94 of the conveyor 60. As the flexible linkage 86 is driven around the sprockets 92, the paddles 80 move in the same direction through each of the compartments 74, 76 in a circuitous path with the flexible linkage 86 being continually passed through the interior of the conveyor housing 62.

Each of the compartments 74, 76 has a receiving end 98, 100. The receiving end 98 of the returns compartment 74 is located at the forward edge of the returns floor 56 below the sieve section 36. The receiving end 98 is open so that tailings or returns can enter the conveyor housing 62. The receiving end 100 of the grain compartment 76 is located below the sieve section 36 and is also open so that clean grain can enter the conveyor housing 62 from the grain floor 52.

Figure 2:
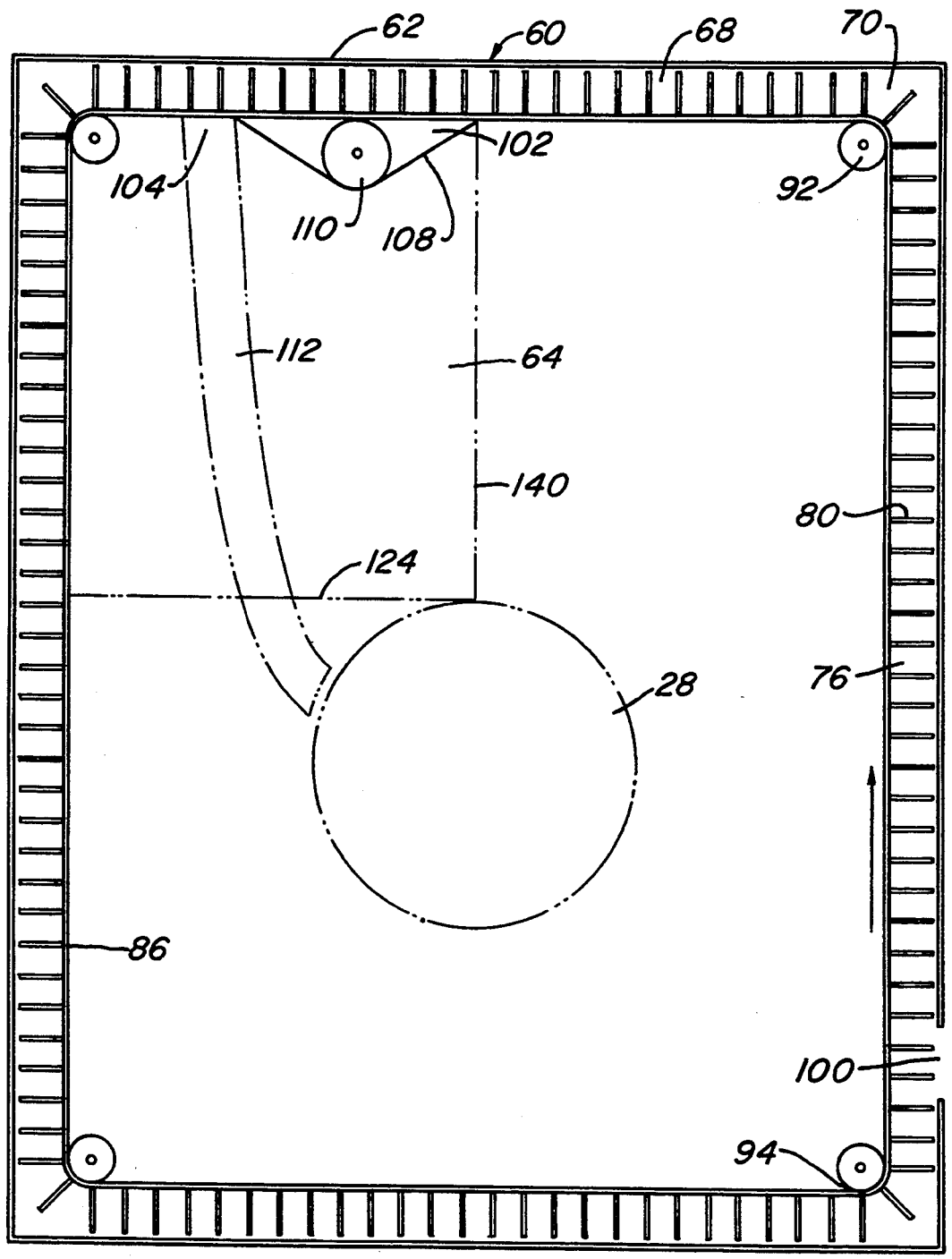
FIG. 2 is a front sectional view of the conveyor housing of FIG. 1 taken along the lines II—II.

As shown in FIG. 2, grain discharge 102 is located above the grain bin 64 and has an auger 110 extending from the conveyor housing 62 over the grain bin 64. The grain discharge 102 is formed by an open portion in the rear wall 106 of the conveyor housing 62 which allows grain to fall into a grain tray 108.

A tailings or returns discharge 104 formed by an opening in the rear wall 106 of the conveyor housing 62 is connected to a chute 112 for directing grain returns to the threshing rotor 28 to be rethreshed.

As shown in FIG. 3, the front of the conveyor housing 62 consists of a cover 114. The cover 114 is removable by means of latches 116 on either side of the conveyor housing 62. This allows an operator to access the interior 68 of the conveyor housing 62 for cleaning or maintenance.

Figure 4:
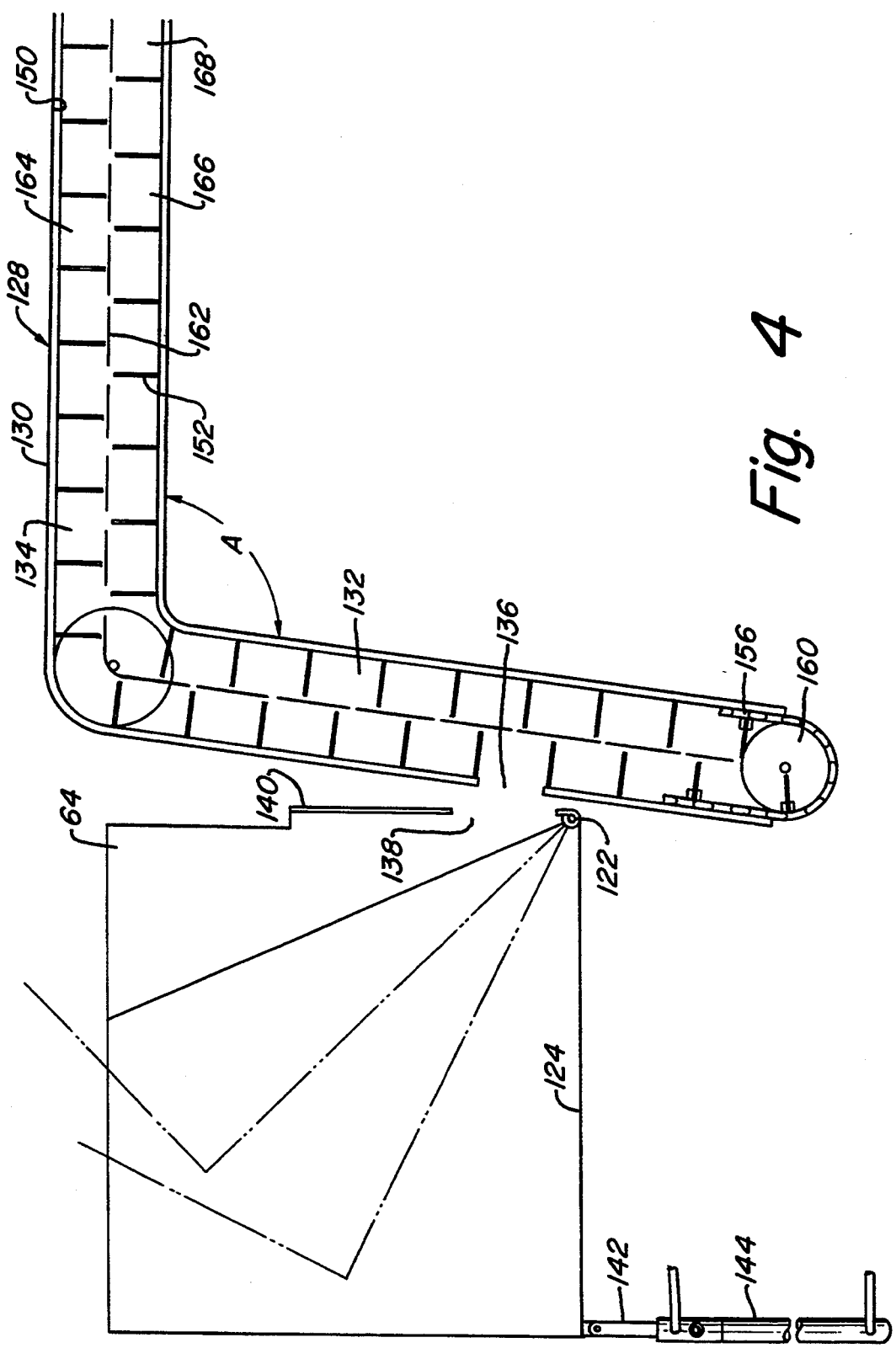
FIG. 4 is a front sectional view of a grain bin and an unloader shown extended away from the frame of the combine and constructed in accordance with the invention.

Referring to FIG. 4, the grain bin 64 of the combine 10 is mounted to the frame 12 along a pivot axis 122. The pivot axis 122 is parallel to the longitudinal axis of the frame 12 of the combine 10. The bottom 124 of the grain bin 64 is substantially flat and located in a plane which is horizontal relative to the frame 12 when the grain bin 64 is in a resting position.

Mounted adjacent to the grain bin 64 is a discharge conveyor or unloader 128. The unloader 128 consists of an unloader housing 130. The unloader housing 130 has a substantially vertical lower section 132 and a substantially horizontal upper section 134. The lower and upper sections 132, 134 are joined together at an angle A, where A is approximately 98 degrees.

Located on the lower section 132 is a grain intake 136 which is an opening in the unloader housing 130. The grain intake 136 is adjacent to and in communication with an opening 138 in the side 140 of the grain bin 64 above the pivot axis 122. This allows grain to flow from the grain bin 64 to the unloader housing 130.

The unloader housing 130 is pivotally mounted to the frame 12 so that the free end of the upper section 134 can be pivoted about a vertical axis from an inward position adjacent to the frame 12 of the combine 10, to an outward position away from the frame 12 of the combine 10, during grain discharge. As can be seen in FIG. 4, the lower section 132 is angled away from the grain bin 64 when the upper section 134 is pivoted to the outward position.

The grain bin 64 is raised and lowered by means of a hydraulic piston 142 and cylinder 144. The piston 142 is pivotally mounted to the grain bin 64 so that as hydraulic fluid is forced into the cylinder 144, the piston 142 can be raised and lowered. By raising the piston 142, the grain bin 64 will pivot about the pivot axis 122 which is located on the side 140 of the grain bin 64 adjacent to the unloader 128. This causes the grain bin 64 to be raised from the resting position, in which the bottom 124 is in a horizontal plane relative to the frame 12, to an inclined position where the bottom 124 of the grain bin 64 is sloped toward the unloader housing 130.

Within the interior 150 of the unloader housing 130 are a plurality of paddles 152 which are spaced apart from each other at intervals. The paddles 152 are mounted to a flexible linkage 156, such as a chain, which extends around a series of pulleys 160. The flexible linkage 156 is rotatably driven around the pulleys 160.

A partition 162 divides the unloader housing 130 into two compartments 164, 166. The paddles 152 are in a near touching relationship with the interior of the unloader housing 150 so that grain does not lodge or pass between the interior 150 and the paddles 152.

The operation of the above-described invention is as follows. Crop is cut by operation of the header assembly 20. The cut crop is fed into the thresher 24 by the chain belt 22. The threshing rotor 28 rotates within the rotor housing 30, the rasp bars (not shown) forcing grain through the apertures (not shown) in the rotor housing 30 as the rotor 28 rotates.

The threshed grain falls from the rotor housing 30 onto the sieves 38, 40. Tailings and chaff will also fall from the rotor housing 30 onto the sieves 38, 40. Chaff is blown to the rear of the combine 10 and out the window (not shown) in the sieve housing 42 by the blower 44. The chaff spreader 48 spreads the chaff uniformly over the ground behind the combine 10.

Tailings or grain returns which are too large to fall through the sieves 38, 40 and too heavy to be blown away by the blower 44 will tend to migrate to the rear of the sieves 38, 40 by the oscillating or reciprocating motion of the sieves 38, 40. The rows of inclined fingers 46 prevent the grain returns from sliding forward down the sloped sieves 38, 40 so that the grain returns will eventually fall from the sieves 38, 40, through the opening 58 and onto the returns floor 56. The sloping returns floor 56 will direct the grain returns to the opening in the receiving end 98 of the returns compartment 74.

The clean grain falls from the sieves 38, 40 and onto the grain floor 52, which is sloped, so that the clean grain slides forward to the opening in the receiving end 100 of the grain compartment 76.

Within the conveyor housing 62, the flexible linkage 86 is driven around the series of sprockets 92. One or more of the sprockets 92 may be driven by conventional means powered by the engine 16. As viewed in FIG. 2, the flexible linkage 86 will rotate in a counterclockwise direction around the interior 68 of the conveyor housing 62. The paddles 80 in each of the compartments 74, 76 move in the same direction, forcing the returns and clean grain from the receiving ends 98, 100 through the conveyor housing 62.

Grain returns in compartment 74 are discharged as the returns fall into the discharge 104 formed by the opening in the rear wall 106 and into the returns chute 112 as the paddles 80 pass over the discharge 104. The returns chute 112 directs the grain returns into the thresher 24 where the threshing rotor 28 rethreshes the grain returns.

Clean grain in the grain compartment 76 is discharged as the grain falls through the opening in the rear wall 106 of the conveyor housing 62 above the grain tray 108. The auger 110 conveys the clean grain collected in the grain tray 108 to the grain bin 64.

When the returns and clean grain are discharged from the conveyor housing 62, the flexible linkage 86 will return the paddles 80 back to the receiving ends 98, 100 as the flexible linkage 86 is rotated around the series of sprockets 92 so that more grain returns and clean grain can be collected.

The unloader housing 130, during the threshing operation, remains in a stored position in which the free end of the upper section 134 is located adjacent to the frame 12 of the combine 10. During discharge of the clean grain, the unloader housing is pivoted so that the free end of the upper section 134 is located in an outward position away from the frame 12 of the combine 10 and over the storage area of a grain truck or other storage equipment.

By providing one of the pulleys 160 with a drive that causes the pulley to rotate, the flexible linkage 156 can be rotated through the interior 150 of the unloader housing 130 causing the paddles 152 to move continuously through the compartments 164, 166. The paddles 152 move through compartment 164 upward through the lower section 132, past the intake 136, through the upper section 134 away from the combine 10, and to the discharge 168. This forces grain from the intake 136, through the compartment 164, and out discharge 168 located on the free end of the upper section 134. Once the paddles 152 move past the discharge 168, the paddles 152 return to the intake 136 through compartment 166. The paddles 152 in each of the compartments 164, 166 move counter to each other.

As the grain is harvested and stored in the grain bin 64, some grain will flow to the intake 136 without raising the grain bin 64 to an inclined position. However, grain on the side of the grain bin 64 away from the opening 138 will tend to remain within the grain bin 64.

In order to facilitate the flow of grain from the grain bin 64, pressurized fluid is forced into the hydraulic cylinder 144 causing the piston 142 to raise. As the piston 142 is raised, the grain bin 64 is pivoted about the pivot axis 122 thereby inclining the bottom 124 of the grain bin 64 so that the bottom 124 slopes downward toward the intake 136 of the unloader housing 130. Gravity causes the grain to slide down the inclined bottom 124 and through the opening 138 to the intake 136 where grain is forced upward through the compartment 164 by the paddles 152 of the unloader housing 130 and discharged from the discharge 168.

Because the lower section 132 of the unloader housing 130 is inclined at an angle away from the frame 12 of the combine 10, the grain bin 64 can be inclined without contacting the unloader housing 130.

The grain bin 64 may be stored in the inclined position to allow water, which may otherwise collect in the grain bin 64, to flow out.

The above-described invention has several advantages over the prior art. Grain, which is normally lost with the tailings that are discharged from the combine, is recovered by returning the tailings to the threshing rotor for rethreshing.

The rectangular construction of the conveyor housing and the flexible linkage allow the conveyor housing to surround the frame of the combine without consuming a large amount of space. The conveyor is easy to maintain and clean and the removable cover allows easy access to the interior of the conveyor.

The conveyor is simply constructed with a single flexible linkage that is used for both returning grain to the grain bin and for returning grain returns to the threshing rotor. There is no need to have a separate or independent conveyor for returning the grain returns to the threshing rotor.

The rectangular construction of the grain bin with the flat bottom creates more volume for grain to be stored than in grain bins having sloped bottoms. The grain is easily forced from the grain bin by inclining the bottom of the grain bin to a position where the bottom is sloped.

The use of the paddle-type unloader in conjunction with the pivotal grain bin is more efficient than using an auger to discharge the grain from the combine. The paddle-type unloader is easy to maintain and clean. The paddle-type unloader requires less energy and force to move the grain upwards and does very little damage to the grain.

While the invention has been shown in only one of its forms, it should be apparent to those skilled in the art that it is not so limited, but is susceptible to various changes without departing from the scope of the invention.

I claim:

1. In a combine having a frame mounted on wheels, a threshing rotor for removing grain from crop, a sieve section wherein clean grain is separated from grain returns such as tailings, and a grain bin for collecting the clean grain, the improvement comprising in combination:
   a conveyor housing mounted to the frame of the combine having an interior, the interior being divided into a returns compartment and a grain compartment by a partition extending along the length of the housing, each of the compartments having a receiving end located adjacent to the sieve section and a discharge end, the receiving end of the returns compartment located below the sieve section for receiving returns from the sieve section, and the receiving end of the grain compartment located below the sieve section for receiving clean grain from the sieve section, the discharge end of the grain compartment located above the grain bin, and the discharge end of the returns compartment located above the threshing rotor;
   a plurality of paddles which are spaced apart from each other at intervals within each of the compartments; and
   drive means for moving the paddles through each of the compartments past the receiving ends to the discharge ends, the paddles in the grain compartment forcing the grain from the receiving end to the discharge end where the clean grain is discharged to the grain bin, the paddles in the returns compartment forcing the returns from the receiving end to the discharge end where the returns are discharged to the threshing rotor for rethreshing.

2. The combine of claim 1, wherein:
   the drive means includes a flexible linkage which is rotatably driven around a series of pulleys, the paddles being mounted to the flexible linkage so that the paddles can be continually passed through the interior of the conveyor housing.

3. The combine of claim 1, wherein:
   the drive means includes a continuous drive chain, the chain being mounted to and rotatably driven around a series of sprockets so that the chain extends and can be continually passed through the interior of the housing; and
   the paddles being joined to the drive chain and spaced apart along the length of the chain.

4. The combine of claim 1, wherein:
   the edges of the paddles are in a near touching relationship with interior walls of each compartment of the conveyor housing as the paddles move through the compartments.

5. The combine of claim 1, wherein:
   the conveyor housing has a removable cover that can be removed to access the interior of the conveyor housing.

6. The combine of claim 1, wherein:
   the conveyor housing extends completely around the combine along both sides of the combine, above the threshing rotor and grain bin, and below the sieve section.

7. The combine of claim 6, wherein:
   the conveyor housing has four corners with sprockets located in each corner;
   the drive means includes a continuous drive chain, the chain being mounted to and rotatably driven around the sprockets so that the chain extends and can be continually passed through the interior of the housing; and
   the paddles being jointed to the drive chain and spaced apart along the length of the chain.

8. The combine of claim 1, wherein:
   one of the compartments is located on the forward side of the conveyor housing and the other is located on the rearward side of the conveyor housing.

9. The combine of claim 1, further comprising:
   a returns chute located adjacent to the discharge of the returns compartment for carrying the returns to the threshing rotor.

10. In a combine having a frame mounted on wheels, a threshing rotor for removing grain from crop, a sieve section wherein clean grain is separated from grain returns such as tailings, and a grain bin for collecting the clean grain, the improvement comprising in combination:
    a conveyor housing mounted to the frame of the combine having an interior, the interior being divided into a returns compartment and a grain compartment by a partition extending along the length of the housing, each of the compartments having a receiving end located adjacent to the sieve section and a discharge end, the receiving end of the returns compartment located below the sieve section for receiving returns from the sieve section, and the receiving end of the grain compartment located below the sieve section for receiving clean grain from the sieve section, the discharge end of the grain compartment located above the grain bin, and the discharge end of the returns compartment located above the threshing rotor;
    a plurality of paddles which are spaced apart from each other at intervals within each of the compartments; and
    drive means having a continuous drive chain, the chain being mounted to and rotatably driven around a series of sprockets so that the chain extends and can be continually passed through the interior of the housing, the paddles being joined to the drive chain so that the paddles move through each of the compartments past the receiving ends to the discharge ends, the paddles in the grain compartment forcing the grain from the receiving end to the discharge end where the clean grain is discharged to the grain bin, the paddles in the returns compartment forcing the returns from the receiving end to the discharge end where the returns are discharged to the threshing rotor for rethreshing.

11. The combine of claim 10, wherein:
    the edges of the paddles are in a near touching relationship with interior walls of each compartment of the conveyor housing as the paddles move through the compartments.

12. The combine of claim 10, wherein:

the conveyor housing has a removable cover that can be removed to access the interior of the conveyor housing.

13. The combine of claim 10, wherein:
the conveyor housing extends completely around the combine along both sides of the combine, above the threshing rotor and grain bin, and below the sieve section.

14. The combine of claim 13, wherein:
the conveyor housing has four corners with the sprockets being located in each corner.

* * * * *